United States Patent
Zeng

(10) Patent No.: US 6,827,765 B2
(45) Date of Patent: Dec. 7, 2004

(54) SCRUBBER FOR REDUCING SILICIFEROUS BYPRODUCTS

(75) Inventor: Guo-Bang Zeng, Jilong (TW)

(73) Assignee: Macronix International Co., Ltd., Hsin-Chu (TW)

(*) Notice: Subject to any disclaimer, the term of this patent is extended or adjusted under 35 U.S.C. 154(b) by 103 days.

(21) Appl. No.: 10/339,495

(22) Filed: Jan. 10, 2003

(65) Prior Publication Data

US 2004/0134356 A1 Jul. 15, 2004

(51) Int. Cl.[7] .............................................. B01D 47/06
(52) U.S. Cl. ............................ 96/273; 96/322; 95/224
(58) Field of Search .......................... 95/199, 200, 224; 96/322, 270, 271, 272, 273, 274, 277

(56) References Cited

U.S. PATENT DOCUMENTS

| | | | | |
|---|---|---|---|---|
| 2,470,438 A | * | 5/1949 | Jackson et al. | 95/199 |
| 2,598,116 A | * | 5/1952 | Du Bois | 95/199 |
| 2,858,903 A | * | 11/1958 | Goetz et al. | 95/72 |
| 3,456,709 A | * | 7/1969 | Vegeby | 159/4.02 |
| 3,532,595 A | * | 10/1970 | Sanberg et al. | 162/47 |
| 4,164,399 A | * | 8/1979 | Kannapell | 261/114.1 |
| 4,469,493 A | * | 9/1984 | Tuovinen et al. | 95/201 |
| 4,898,720 A | * | 2/1990 | Glindsjo | 423/210 |
| 5,226,934 A | * | 7/1993 | Lefren | 95/224 |

FOREIGN PATENT DOCUMENTS

TW           346838         12/1998

* cited by examiner

Primary Examiner—Duane S. Smith

(57) ABSTRACT

A scrubber for removing particles from waste gas. The scrubber comprises a chamber and a water-injecting device. The chamber has an outlet, an inlet connected to a gas inlet pipe, and a plurality of sprayers connected to a water source to spray water into the chamber. The water-injecting device is disposed at the outlet and connected to the water inlet pipe. The water-injecting device has an annular gap to inject water and provide a water film over the outlet of the chamber, filtering out particles and corrosive gases.

4 Claims, 3 Drawing Sheets

SCRUBBER FOR REDUCING SILICIFEROUS BYPRODUCTS

BACKGROUND OF THE INVENTION

1. Field of the Invention

The present invention relates to a scrubber, and in particular to a scrubber for filtering out siliciferous byproducts from waste gas.

2. Description of the Related Art

FIG. 1 shows a conventional scrubber used in semiconductor factories. The scrubber 10 is connected to a gas inlet pipe 1, a gas outlet pipe 2, a water inlet pipe (not shown) and a drainpipe 5. The gas inlet pipe 1 is connected to the inlet 11 near the lower portion of the scrubber 10. The gas outlet pipe 2 is connected to the outlet 12 at the top portion of the scrubber 10. The drainpipe 5 is connected to the bottom portion 13 of the scrubber 10. The conventional scrubber 10 has a plurality of sprayers 14 connected to the water inlet pipe to spray water into the scrubber 10. The nebulized water 141 humidifies the waste gas ($G_{in}$) introduced from the gas inlet pipe 1 to catch siliciferous particles (Si, $Si_3N_4$) and dissolve corrosive gas ($NH_4$, $SiH_2Cl_2$, $SiH_4$) produced during semiconductor processes. Wastewater is then discharged from the drainpipe 5 and treated by a sewage treatment system.

The conventional scrubber 20 sprays water to remove siliciferous particles and corrosive gases, however, some particles still pass through the chamber with the gas flow and enter the gas pipe because they are too small (about 1 μm~5 nm) and light. These sub-micron particles are either deposited in the exhaust pipe, or discharged into the atmosphere, as airborne contamination, causing air pollution.

Hence, there is a need for a dependable air scrubber to filter most of siliciferous particles and corrosive gases from the waste gas discharged from semiconductor equipment.

SUMMARY OF THE INVENTION

Accordingly, an object of the invention is to provide a modified scrubber to filter siliciferous byproducts suspended in the corrosive waste gas discharged from semiconductor process. The scrubber further keeps sub-micron particles from being deposited in the exhaust pipe, decreasing the running cost.

Moreover, corrosive gases used in semiconductor processes can be dissolved in the water and treated by a sewage treatment system. Thus, air pollution caused by the waste gas is reduced.

The present invention provides a scrubber connected to a gas inlet pipe and a water inlet pipe. The scrubber comprises a chamber and a water-injecting device. The chamber has an outlet, an inlet connected to the gas inlet pipe, and a plurality of sprayers connected to the water inlet pipe to spray water into the chamber. The water-injecting device is disposed at the outlet and connected to the water inlet pipe. The water-injecting device has an annular gap and injects water to provide a first water film over the outlet of the chamber, flushing out the particles from the waste gas.

According to the embodiment, the water-injecting device has an outer pipe wall and an inner pipe wall with a gap to provide the first water film. Water is introduced from the water inlet pipe through the space between the outer pipe wall and inner pipe wall.

Moreover, the water-injecting device also has a waterspout disposed in the center of the inner pipe wall above the first water film, providing a second water film over the outlet of the chamber. The chamber further includes a water outlet to drain water from the chamber.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
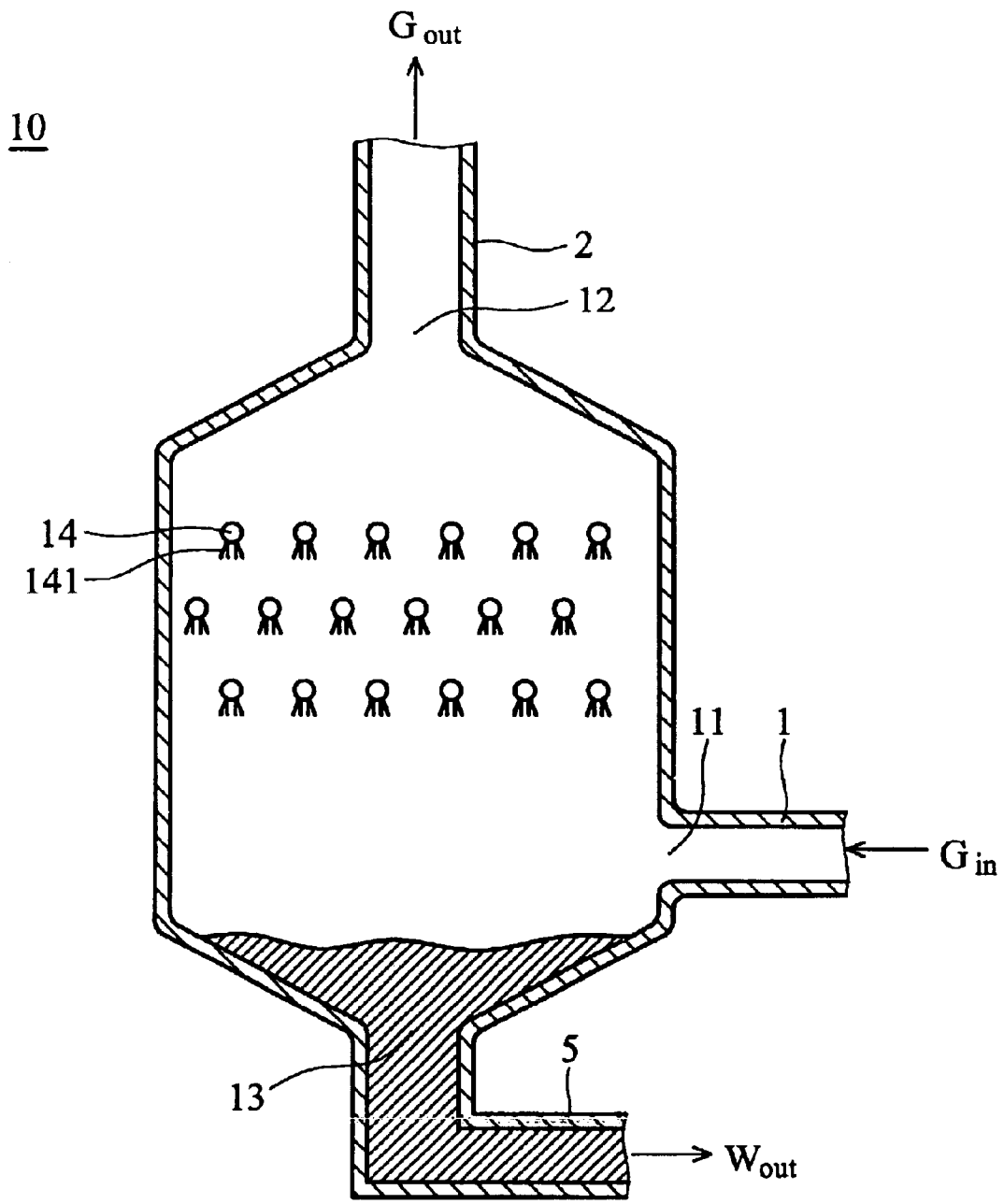
FIG. 1 is a schematic view of a conventional srubber used in semiconductor factories.
Figure 2A:
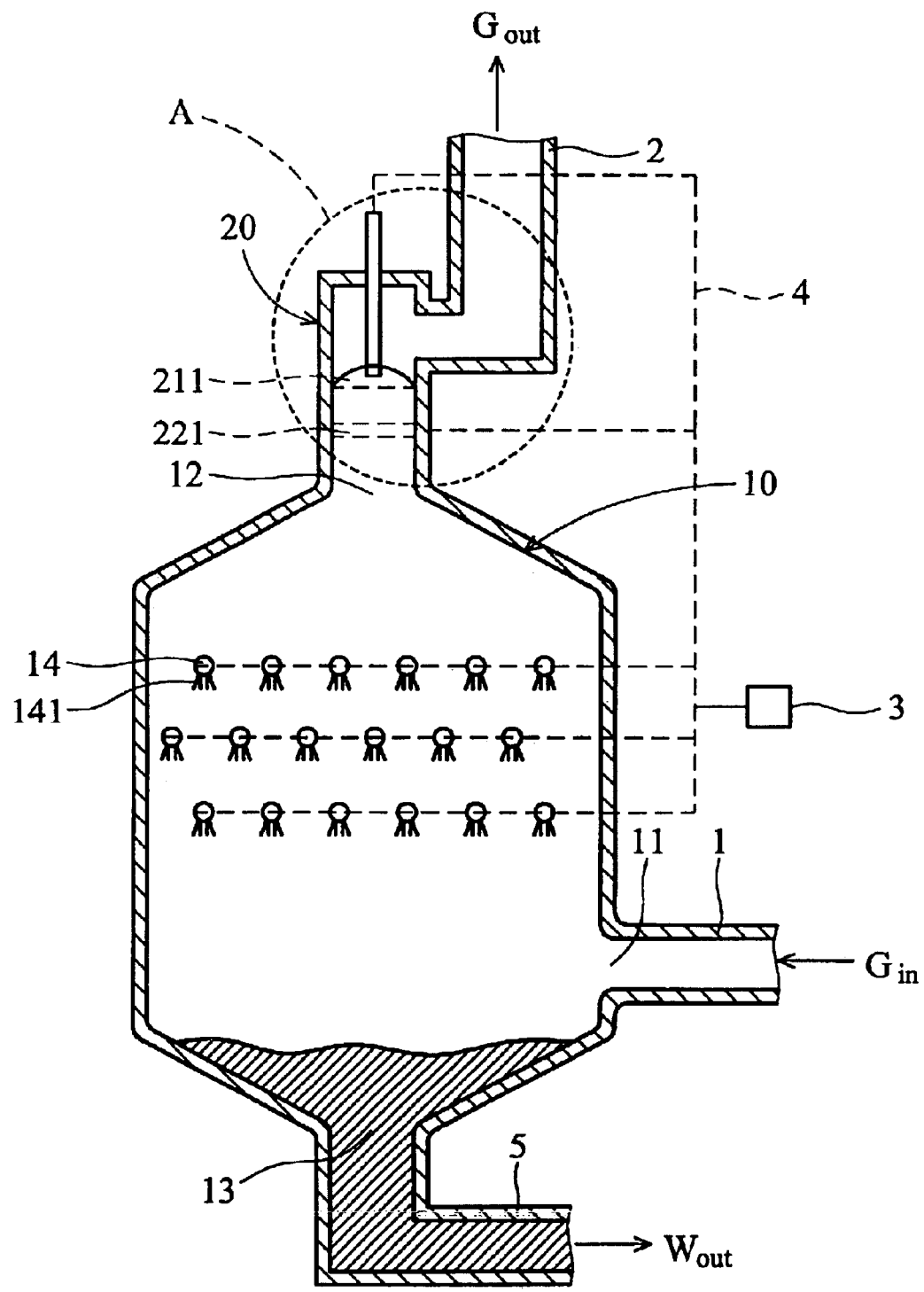
FIG. 2A is a schematic view of a scrubber of the invention.

FIG. 2A shows a scrubber used to filter the particles from waste gas discharged from semiconductor process. The scrubber is connected to a gas inlet pipe 1, a gas outlet pipe 2 and a water source 3 by a water inlet pipe 4. The scrubber of the present invention comprises a conventional scrubber 10 and an additional water-injecting device 20. The scrubber 10 has an outlet 12, an inlet 11 connected to the gas inlet pipe 1, and a plurality of sprayers 14 mounted on the wall thereof and connected to the water inlet pipe 4 to spray water into the scrubber 10. The water-injecting device 20 is disposed between the outlet 12 of the scrubber 10 and the gas outlet pipe 2. The water-injecting device 20 has an annular gap (not shown) and a waterspout 21 connected to the water inlet pipe 4 to produce two water films 211, 221 over the outlet 12 of the scrubber 10 to flush particles from the waste gas. Furthermore, the scrubber 10 also has a water outlet 13 connected to a water outlet pipe 5 to discharge wastewater ($W_{out}$).

Figure 2B:
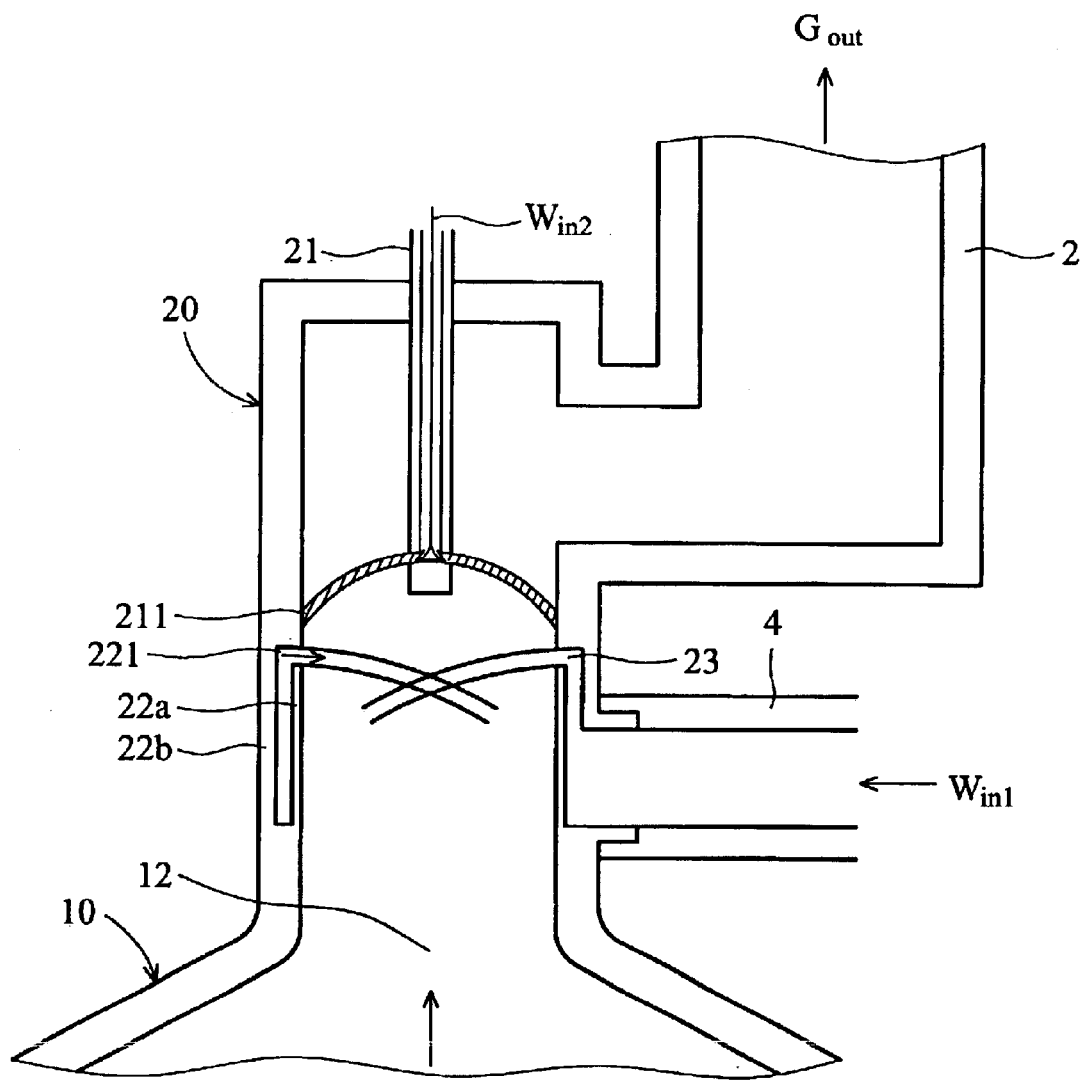
FIG. 2B is an enlarged view of area A in FIG. 2A.

FIG. 2B is an enlarged cross-section of area A in FIG. 2A. FIG. 2B shows the water-injecting device 20 having a portion with an outer pipe wall 22b and an inner pipe wall 22a. There is an annular gap 23 on the inner pipe wall 22a to provide the first water film 221 introduced from the water inlet pipe 4 ($W_{in1}$) through the space between the outer pipe wall 22b and inner pipe wall 22a. The water-injecting device 20 also has an end with a waterspout 21 disposed in the center between the inner pipe wall 22a above the first water film 221 to provide a second water film 211 over the outlet 12 of the scrubber 10.

Referring to FIGS. 2A, 2B, the waste gas with siliciferous particles and corrosive gases produced by semiconductor process is blown into the scrubber 10 from the gas inlet pipe 1 ($G_{in}$). The sprayed water 141 humidifies the waste gas in the scrubber 10 and reacts with corrosive gas ($G_{in}$), such as $CF_4$, $SiH_2Cl_2$ and HBr, therein. At the same time, the particles from the waste gas are covered with a film of water, which increases the weight of the particles. However, the particles with a water film are still too light, and are easily pushed up through the array of sprayers 14 to enter the water-injecting device 20. The particles from the waste gas are easily flushed by the first water film 221 injected from the annular gap 23 because of the water film thereon. Since some particles pass through the first water film, a second water film 211 is produced by the waterspout ($W_{in2}$) to further prevent particles from entering the gas outlet pipe 2. After filtering out particles and corrosive gas, the gas ($G_{out}$)

is finally drawn from the gas outlet pipe 2 to a central gas discharge system and discharged to the atmosphere without causing air pollution.

Moreover, wastewater carrying the filtered siliciferous particles is treated by a sewage treatment system and discharged or recycled.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A scrubber connected to a gas inlet pipe and a water inlet pipe for removing particles from waste gas introduced from the gas inlet pipe, comprising:

a chamber, having an outlet, an inlet connected to the gas inlet pipe, and a plurality of sprayers connected to the water inlet pipe to spray water into the chamber; and a water-injecting device, disposed on the outlet and connected to the water inlet pipe, wherein the water-injecting device has an annular gap to inject water and form a first water film over the outlet of the chamber.

2. The scrubber as claimed in claim 1, wherein the water-injecting device has an outer pipe wall and an inner pipe wall with a gap between to provide the first water film introduced from the water inlet pipe through a passage between the outer pipe wall and inner pipe wall.

3. The scrubber as claimed in claim 2, wherein the water-injecting device has a waterspout disposed in the center of the inner pipe wall above the first water film to provide a second water film over the outlet.

4. The scrubber as claimed in claim 1, wherein the chamber has a water outlet to drain water from the chamber.

* * * * *